United States Patent
Lee et al.

(10) Patent No.: US 8,949,618 B1
(45) Date of Patent: Feb. 3, 2015

(54) DISPLAY DEVICE AND METHOD FOR CONTROLLING THE SAME

(71) Applicant: LG Electronics Inc., Seoul (KR)

(72) Inventors: Doyoung Lee, Seoul (KR); Jongho Kim, Seoul (KR); Yongsin Kim, Seoul (KR); Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/212,705

(22) Filed: Mar. 14, 2014

(30) Foreign Application Priority Data

Feb. 5, 2014 (KR) .................. 10-2014-0012905

(51) Int. Cl.
  *G06F 21/00* (2013.01)
  *G06F 21/32* (2013.01)
  *G06F 3/041* (2006.01)

(52) U.S. Cl.
  CPC ............... *G06F 21/32* (2013.01); *G06F 3/041* (2013.01)
  USPC ............................. 713/186; 382/124; 726/7

(58) Field of Classification Search
  CPC ....... G06F 21/32; G06F 21/31; H04L 9/3231; H04L 63/0861
  See application file for complete search history.

(56) References Cited

U.S. PATENT DOCUMENTS

| | | | |
|---|---|---|---|
| 7,162,059 B2 * | 1/2007 | Yoo et al. | 382/124 |
| 2007/0057764 A1 * | 3/2007 | Sato et al. | 340/5.52 |
| 2008/0267464 A1 * | 10/2008 | Goda | 382/124 |
| 2010/0240415 A1 | 9/2010 | Kim et al. | |
| 2011/0081889 A1 * | 4/2011 | Gao et al. | 455/411 |
| 2011/0239286 A1 * | 9/2011 | Hiraide | 726/7 |
| 2011/0273267 A1 | 11/2011 | Bong | |
| 2012/0047574 A1 * | 2/2012 | Kim et al. | 726/18 |
| 2012/0105081 A1 | 5/2012 | Shaikh et al. | |
| 2013/0086508 A1 * | 4/2013 | Oguz | 715/779 |
| 2013/0322705 A1 | 12/2013 | Wong | |
| 2013/0324089 A1 | 12/2013 | Kim et al. | |

FOREIGN PATENT DOCUMENTS

EP  2 228 750 A2  9/2010

* cited by examiner

*Primary Examiner* — Fikremariam A Yalew
(74) *Attorney, Agent, or Firm* — Birch, Stewart, Kolasch & Birch, LLP

(57) ABSTRACT

A display device includes a display unit configured to display an image and to sense a touch input; a sensor unit configured to sense a fingerprint from the touch input; a storage unit configured to store data; and a processor configured to control the display unit, the sensor unit, and the storage unit, wherein the processor is further configured to: detect a selection input for selecting first information, the first information having a security on state or a security off state; obtain the fingerprint from the selection input, and convert the first information from the security on state into the security off state when the obtained fingerprint is matched with a pre-stored fingerprint; and when a predetermined was detected before the first information is converted into the security off state, maintain the first information to the security on state by not obtaining the fingerprint from the selection input.

18 Claims, 10 Drawing Sheets

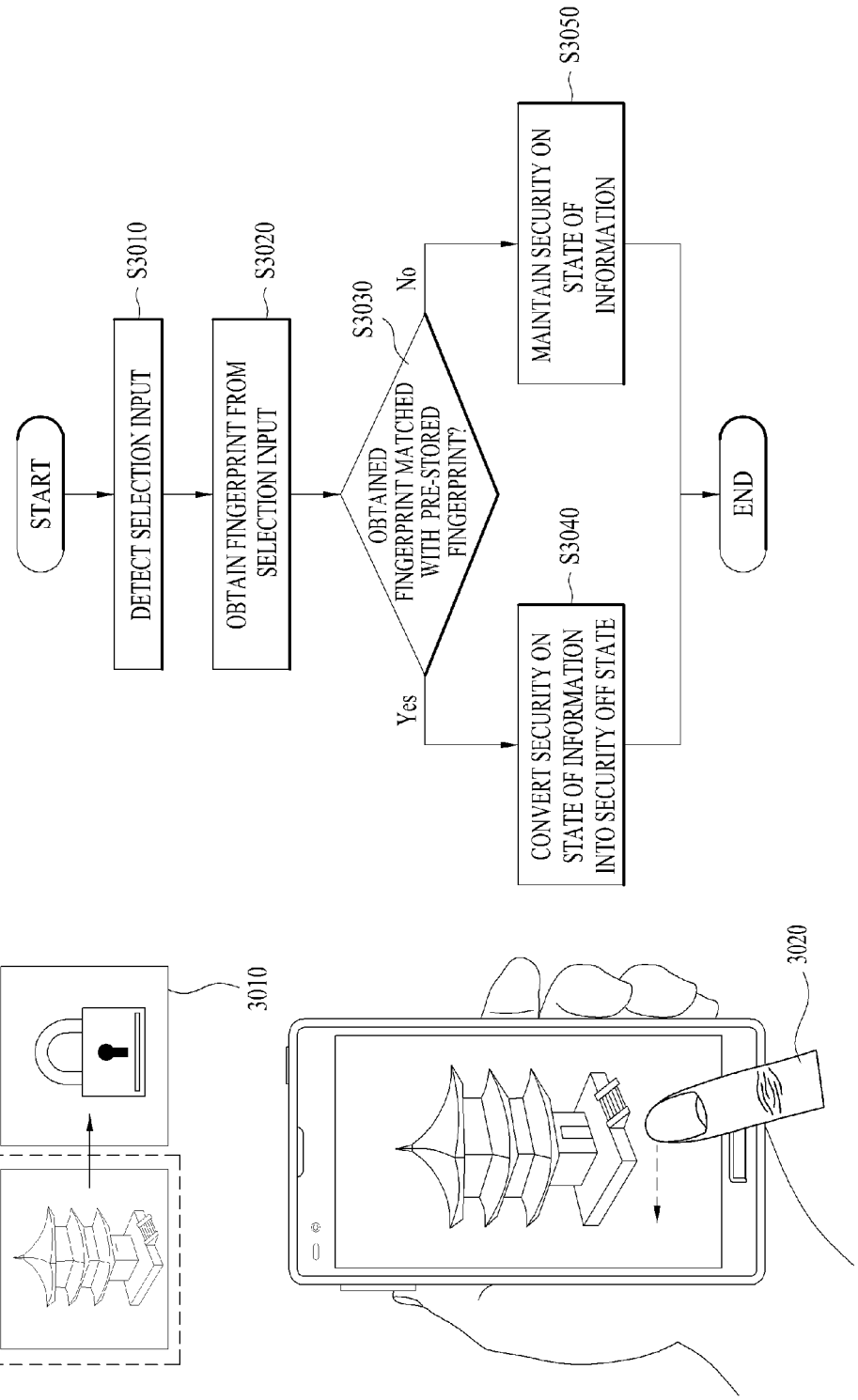

FIG. 6
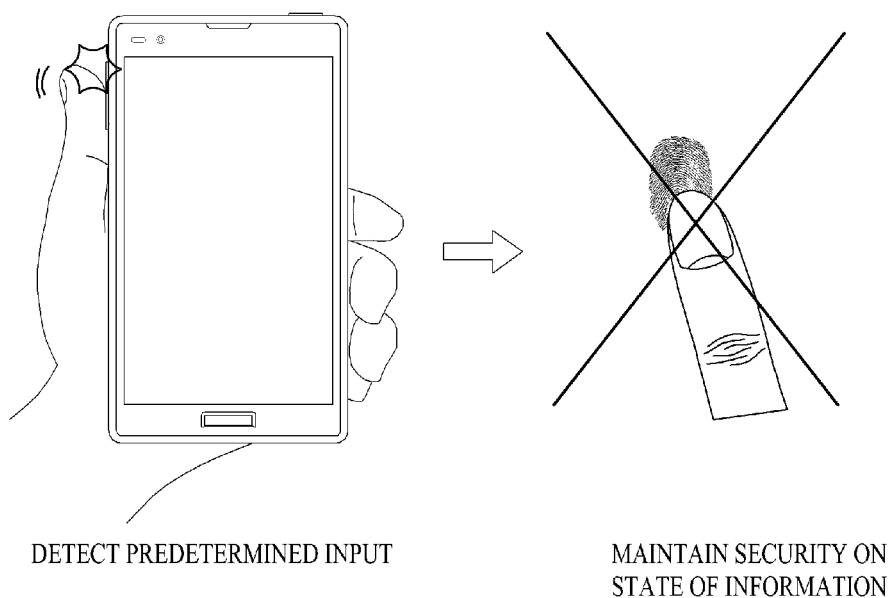
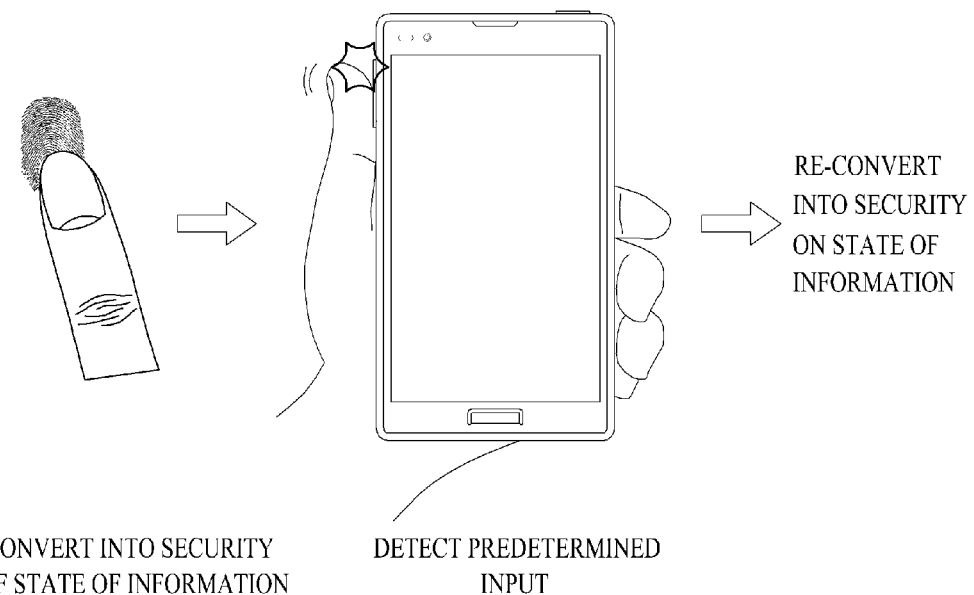

DISPLAY DEVICE AND METHOD FOR CONTROLLING THE SAME

Pursuant to 35 U.S.C. §119(a), this application claims the benefit of Korean Patent Application No. 10-2014-0012905, filed on Feb. 5, 2014, which is hereby incorporated by reference as if fully set forth herein.

BACKGROUND OF THE INVENTION

1. Field of the Invention

The present specification relates to a display device and a method for controlling the same, and more particularly, to a display device that obtains a fingerprint or does not obtain a fingerprint from selection input according to predetermined input to maintain or off security of information, and a method for controlling the display device.

2. Discussion of the Related Art

A display device refers to various types of devices for processing digital data and performing an operation corresponding thereto. As the performance of a display device is improved, it is possible to execute various types of multimedia contents via the display device.

During use of a display device, the user may allow himself or herself only to access specific information. For example, the user may set the display device to restrict access of other people to specific information such as specific photos, pictures, documents, applications, etc. stored in the display device and to be available by himself or herself only. In this case, the user may set security for specific information through the display device to restrict access of other people. Accordingly, the user needs to convert security on state of information into a security off state in order to access the security-set information.

However, a user interface for converting a security on state of such information into a security off state makes access of the user to the information difficult. Accordingly, a conventional display device can off security of information by simply selecting security-set information without input of a separate password or an authentication procedure for releasing security of information. This is because the display device can determine whether access is allowed by obtaining a fingerprint from selection input.

However, in this case, information in a security on state can be automatically off by simply inputting selection by a user without separate input of the user. Accordingly, when a user uses a display device together with other people, problems arise in that security-set information is indiscriminately exposed to other people.

SUMMARY OF THE INVENTION

Accordingly, the present specification is directed to a display device and a method for controlling the same that substantially obviates one or more problems due to limitations and disadvantages of the related art.

An object of the present specification is to provide a display device that does not obtain a fingerprint from selection input when predetermined input for maintaining a security on state is detected, and a method for controlling the display device.

Another object of the present specification is to provide a display device that does not match an obtained fingerprint and a pre-stored fingerprint from selection input when predetermined input for maintaining a security on state is detected, and a method for controlling the display device.

Another object of the present specification is to provide a display device that does not convert information into a security off state but maintains the security on state even if an obtained fingerprint and a pre-stored fingerprint are matched with each other from selection input when predetermined input for maintaining a security on state is detected, and a method for controlling the display device.

Another object of the present specification is to provide a display device that re-converts corresponding information into a security on state when predetermined input is detected after the information is converted into a security off state.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, A display device comprising: a display unit configured to display an image and to sense a touch input; a sensor unit configured to sense a fingerprint from the touch input on the display unit; a storage unit configured to store data; and a processor configured to control the display unit, the sensor unit, and the storage unit, wherein the processor is further configured to: detect a selection input for selecting first information to be output, the first information having a security on state or a security off state; obtain the fingerprint from the selection input when the selection input is detected, and convert the first information from the security on state into the security off state when the obtained fingerprint is matched with a pre-stored fingerprint; and when a predetermined input for the first information was detected before the first information is converted into the security off state, maintain the first information to the security on state by not obtaining the fingerprint from the selection input when the selection input is detected. It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart of a method for controlling a digital device for converting security on state information into a security off state;

FIG. 6 is a diagram illustrating an embodiment for detecting predetermined input based on a point of time when security on state information into a security off state;

DETAILED DESCRIPTION OF THE INVENTION

The terms used in the present specification are defined in consideration of functions used in the present specification, and can be changed according to the intent, conventionally used methods of operators, or advent of new technologies. In specific cases, the terms can be selected by an application. In this case, the meaning of the terms will be described in a corresponding embodiment. Accordingly, definitions of the terms should be understood on the basis of the substantial meaning and the entire description of the present specification instead of simple names of the terms.

Reference will now be made in detail to the embodiments, examples of which are illustrated in the accompanying drawings. However, the embodiments should not be construed as limited to the exemplary embodiments set forth herein.

In the present specification, a display device may provide selected information according to detected selection input of a user. In this case, the provided information may be in a security on state or security off state. Here, the security on state may refer to a state in which corresponding information is provided to only a user who is allowed access to the information. Accordingly, the security on state may refer to a state in which a predetermined fingerprint is required to provide the corresponding information to the user. In addition, the security off state may refer to a state in which the corresponding information can be provided to all users regardless of whether access is allowed. Accordingly, the security off state may refer to a state in which a predetermined fingerprint is not required to provide the corresponding information to the user.

Accordingly, the display device may obtain or not obtain a fingerprint from touch input according to a security state of the selected information. Furthermore, the display device may obtain or not obtain a fingerprint according to predetermined user input for deterring fingerprint recognition, which will be described with reference to the accompanying drawings. Hereinafter, a display device will be referred to as a device for convenience of description.

Figure 1:
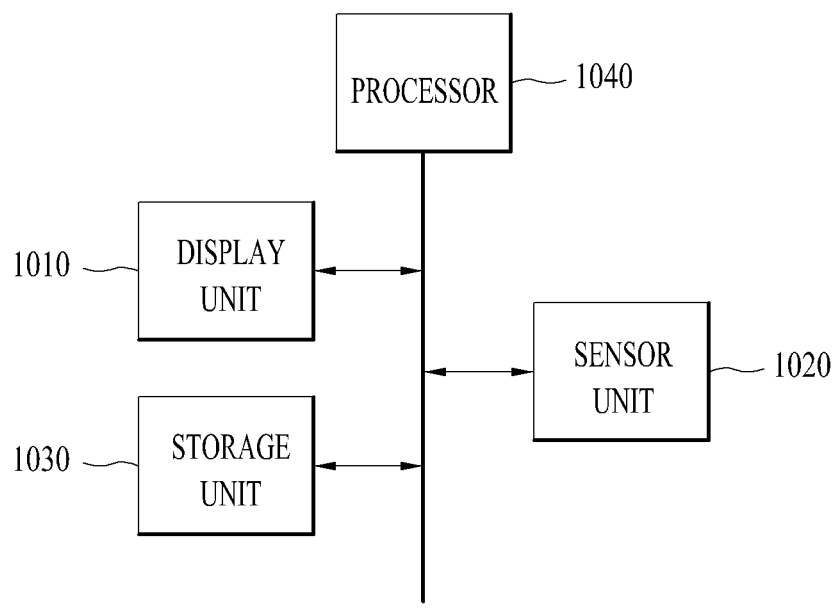
FIG. 1 is a block diagram of a display device according to an embodiment.

FIG. 1 is a block diagram of a display device according to an embodiment. In FIG. 1, the device may include a display unit 1010, a sensor unit 1020, a storage unit 1030, and a processor 1040.

The display unit 1010 may display an image. The display unit 1010 may display the image based on an application executed by the processor 1040 or a control command of the processor 1040. Here, the image may refer to visual information recognizable by eyesight of a user and include an image for execution of a photo, a picture, a text, a moving picture, an application, etc. In addition, the display unit 1010 may sense touch input on the display unit 1010. In this case, the display unit 1010 may include a sensor for sensing touch input, such as a touch sensor, a pressure sensor, etc. so as to sense various touch inputs.

The sensor unit 1020 may sense a fingerprint from the touch input on the display unit 1010. In more detail, the sensor unit 1020 may scan or capture the fingerprint from the touch input on the display unit 1010 to sense the fingerprint. In this case, the sensor unit 1020 may sense the fingerprint using at least one sensor mounted on the device. According to an embodiment, the at least one sensor may include a fingerprint sensor, a pressure sensor, an illumination sensor, a brightness sensor, a touch sensor, a camera sensor, etc. In addition, the at least one sensing unit may include various sensors for sensing a fingerprint from touch input and embodiments of the specification are not limited to the aforementioned embodiment. The aforementioned sensors may be a separate element included in the device or may be integrated as at least one element included in the device.

Furthermore, the sensor unit 1020 may transmit a sensing result to the processor 1040. The processor 1040 may perform various operations based on a sensing result received from the sensor unit 1020.

In addition, in the specification, the sensor unit 1020 may be included in the device together with the display unit 1010. In other words, the sensor unit 1020 may be integrated with the display unit 1010 and may be included in the device. For example, the display unit 1010 and the sensor unit 1020 may have an interlayer structure and may be included in the device. Accordingly, the device may simultaneously sense touch input on the display unit 1010 and a fingerprint of the corresponding touch input.

The storage unit 1030 may store data. In more detail, the storage unit 1030 may store various digital data such as video, audio, a photo, a document, an application, etc. The storage unit 1030 may refer to various digital data storage spaces such as a flash memory, a random access memory (RAM), a solid state drive (SSD), etc. In particular, in the specification, the storage unit 1030 may store various digital data regarding a fingerprint. For example, the storage unit 1030 may store fingerprint image data, data regarding a user corresponding to each fingerprint image, data regarding a security level of each user, etc.

The processor 1040 may control each of the aforementioned units of the device and control data transmission/reception between the units. In addition, the processor 1040 may process data in the device to execute various applications.

In particular, in the specification, the processor 1040 may obtain a fingerprint from the touch input on the display unit 1010, and convert a security on state of information into a security off state when the obtained fingerprint is matched with a pre-stored fingerprint, which will be described below with reference to FIG. 3. In this case, the touch input on the display unit 1010 may be selection input of the user for selecting information to be output.

When security on state of information is converted into a security off state, the processor 1040 may output information converted into a security off state. Accordingly, when information is visual information, the processor 1040 may display visual information using the display unit 1010. However, upon detecting predetermined input for maintaining the security on state of the information, the processor 1040 may not obtain a fingerprint or may not match the obtained fingerprint with the pre-stored fingerprint to maintain the security on state of the information, which will be described below in detail with reference to FIGS. 3 to 6.

Hereinafter, when each step or operation performed by the device is begun or performed by sensing of user input, the above description is assumed to be applied to a procedure for generating and receiving a signal according to the sensed user input without its repeated description. In addition, it may be expressed that the processor 1040 controls the device or at least one unit included in the device according to user input and the processor 1040 may be equated to the device.

FIG. 1 is a block diagram of the device according to an embodiment. The separately indicated blocks are formed by logical elements of the device. Accordingly, the aforementioned elements of the device may be mounted as a single chip or a plurality of chips according to a design of the device.

Figure 2:
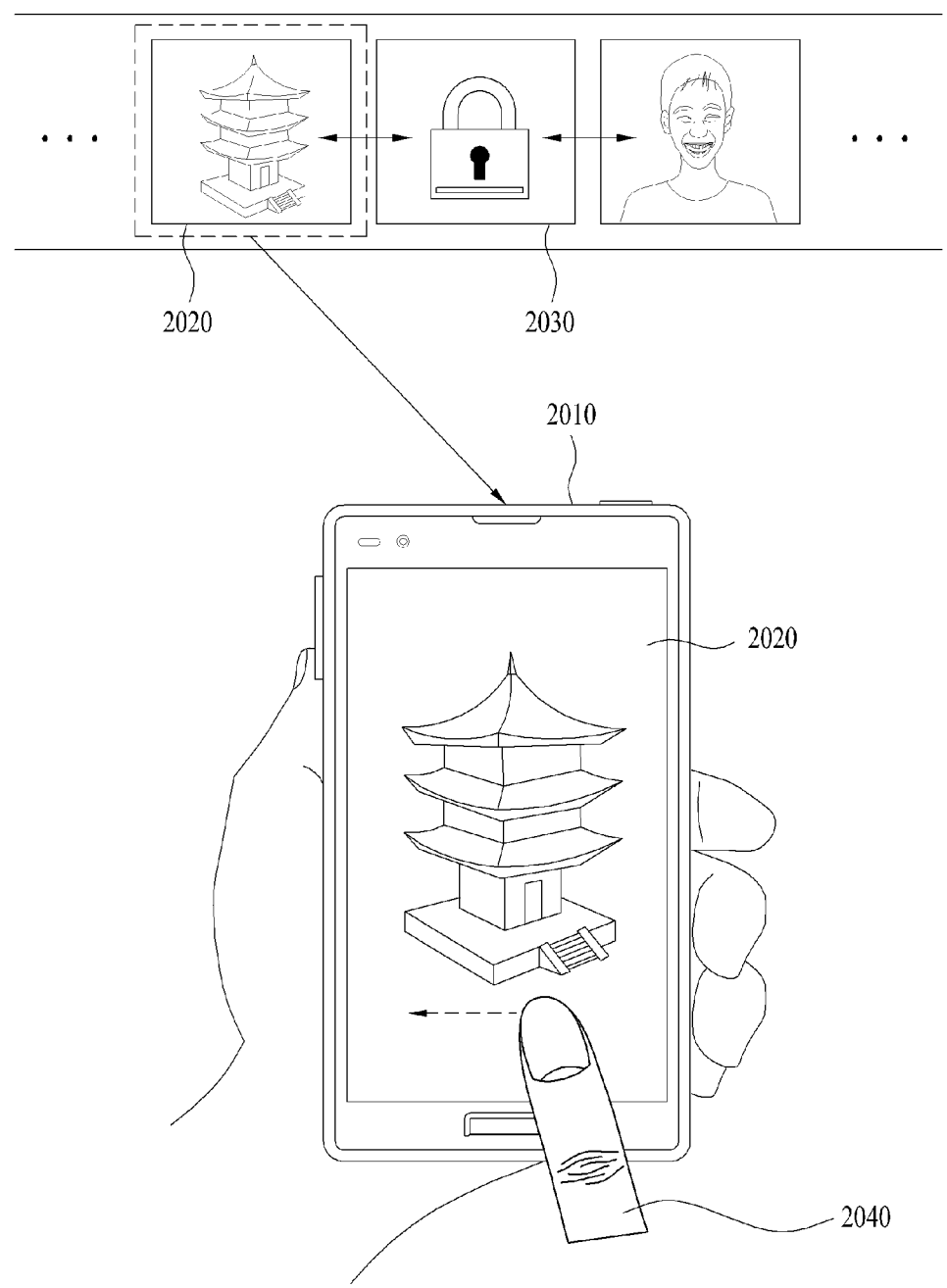
FIG. 2 is a diagram illustrating an embodiment of a display device for detecting selection input for selection of information in a security on state.

FIG. 2 is a diagram illustrating an embodiment of a display device 2010 for detecting selection input for selection of information in a security on state.

The device 2010 may provide various information according to the detected user input. In this case, the information may refer to visual information, audible information, tactile information, and/or olfactory information. When the selected information is visual information, the corresponding information may correspond to a picture, a photo, a home screen, a document, a text, an application execution image, or a moving picture. The information may be security on state information 2030 or security off state information 2020. As described above, the security on state information 2030 may be provided to a user who is allowed access and the security off state information 2020 may be provided to all users regardless of whether access is allowed.

The information may be provided according to selection input 2040 for selection of information. In more detail, the device 2010 may detect the selection input 2040 for selection of information to be output and output the selected information according to the detected selection input 2040. Here, the selection input 2040 may refer to various touch inputs for selection of information. For example, the selection input 2040 may be short-press input of touching the information to be output. As another example, the selection input 2040 may be slide input of touching a screen of a display unit by as much as a distance that exceeds a predetermined length so as to convert the image into the information to be output. In addition, the selection input 2040 may refer to various touch inputs such as long-press input, short-press input, drag input, etc.

When the information 2030 in security on state is selected according to the selection input 2040, the device 2010 may obtain a fingerprint from the selection input 2040 in order to determine whether a user of the selection input 2040 is allowed access to the information 2030 in the security on state. When the user of the selection input 2040 is determined to be a user who is allowed access to the information 2030 in the security on state, the device 2010 may convert a security on state of information 2030 into a security off state. On the other hand, when the user of the selection input 2040 is not determined to be a user who is allowed access to the information 2030 in the security on state, the device 2010 may maintain the security on state of the information 2030. Likewise, the device 2010 may determine whether the user of the selection input 2040 is allowed access to the information 2030 in the security on state by using obtained fingerprint, which will be described in detail with reference to FIG. 3.

Hereinafter, for convenience of description, description will be given in terms of the device 2010 that detects the selection input 2040 for selecting the information 2030 in the security on state while the information 2020 in the security off state is provided, as illustrated in FIG. 2. In addition, hereinafter, description will be given in terms of the device 2010 in which the selection input 2040 is slide input 2040 for selection of the information 2030 in the security on state.

FIG. 3 is a flowchart of a method for controlling a digital device for converting security on state of information into a security off state.

In the present specification, the device may convert security on state of information 3010 into a security off state and output or provide the information converted into a security off state to only a user who is allowed access to the information 3010 in the security on state. To this end, the device may obtain a fingerprint of a user and determine whether the user is allowed access to the corresponding information.

In more detail, the device may detect selection input 3020 (S3010). Here, the selection input 3020 may refer to various touch inputs on a display unit for selection of the information 3010 to be output. A detailed description of the selection input 3020 is the same as that of FIG. 2. The device may detect the selection input 3020 using at least one sensor included in the display unit.

Then, the device may obtain a fingerprint from the detected selection input 3020 (S3020). In more detail, when the information 3010 selected according to the selection input 3020 is in a security on state, the device may obtain a fingerprint from the selection input 3020 of the user in order to determine whether the user is allowed access to the information 3010 in the security on state. In this case, the device may obtain a fingerprint from the selection input 3020 using a sensor unit. In some embodiments, the sensor unit may be provided together with the display unit, as described with reference to FIG. 1.

Then, the device may determine whether the obtained fingerprint is matched with a pre-stored fingerprint (S3030). In more detail, the device may compare the fingerprint obtained in the previous step with the fingerprint stored in a storage unit and judge whether a matched degree between two fingerprints exceeds a threshold value. Here, the pre-stored fingerprint may refer to a fingerprint that is pre-stored in the storage unit and refer to a fingerprint corresponding to the user who is allowed access to the selected information 3010.

When the obtained fingerprint is matched with the pre-stored fingerprint, the device may convert a security on state of the information 3010 into a security off state (S3040). In more detail, upon determining that the obtained fingerprint and the pre-stored fingerprint are matched with each other according to a comparison result that the matched degree exceeds a threshold value, in the previous step, the device may convert a security on state of the selected information 3010 into a security off state. This is because matching between the obtained fingerprint and the pre-stored fingerprint means that a user of the selection input 3020 is allowed access to the selected information 3010. When the security on state of information 3010 is converted into a security off state, the device may output the corresponding information 3010 or provide the corresponding information 3010 to the user.

When the obtained fingerprint is not matched with the pre-stored fingerprint, the device may maintain a security on state of the information 3010 (S3050). In more detail, upon determining that the obtained fingerprint and the pre-stored fingerprint are not matched according to a comparison result that the matched degree is equal to or less than a threshold value, in the previous step, the device may maintain a security on state of the selected information 3010. This is because mismatch between the obtained fingerprint and the pre-stored fingerprint means that a user of the selection input 3020 is not allowed access to the selected information 3010. When the security on state of the information 3010 is maintained, the device may skip the corresponding information 3010 or display a security image, which will be described below in more detail with reference to FIGS. 5A and 5B.

The aforementioned security off operation of the device may be automatically performed by the device without separate input of a user. That is, the device may automatically obtain a fingerprint from the selection input 3020 without separate input in order to convert a security on state into a security off state as long as the security on state information 3010 is selected. Accordingly, as long as the user of the selection input 3020 is allowed to access, the security on state of information 3010 may be automatically converted into the security off state and may be provided to the corresponding user.

However, in this case, the user may frequently want to maintain a security on state of the corresponding information 3010. For example, when the user sees a photo together with another person, since the device automatically off security according to the selection input 3020 regardless of presence of another person, the information 3010 may also be exposed to another person other than a user who is allowed access. Accordingly, in order to prevent this problem, the device may detect separate user input for deterring fingerprint recognition, which will be described below in detail with reference to FIGS. 4A to 5B.

Figure 4A:
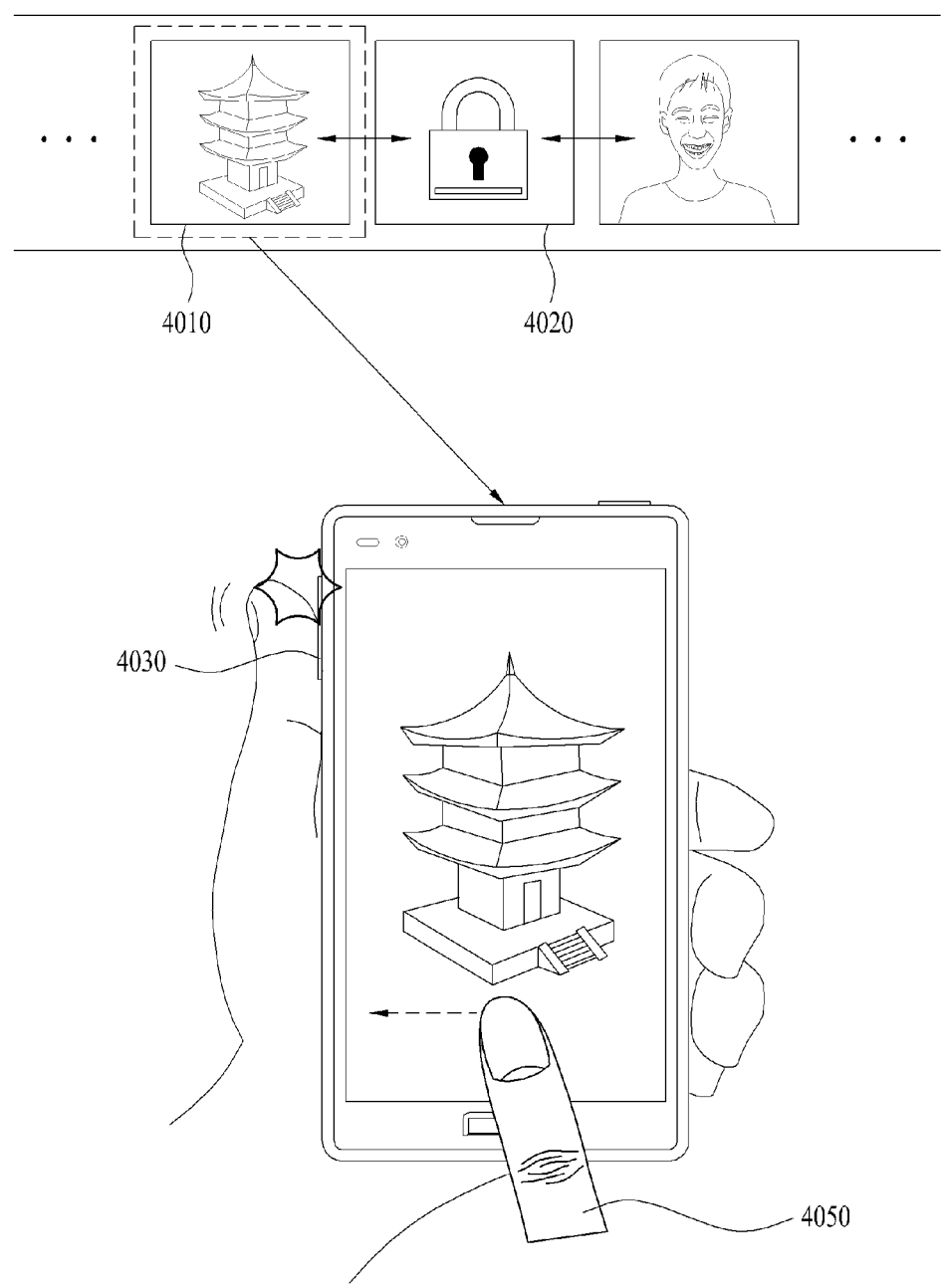
FIG. 4A is a diagram illustrating an embodiment of a display device that detects predetermined input and maintains a security on state of information.

FIG. 4A is a diagram illustrating an embodiment of a display device that detects predetermined input and maintains a security on state of information.

When a plurality of information 4010 and 4020 is sequentially provided in predetermined sequences according to selection input (e.g., slide input) 4050 (for example, when photos 4010 and 4020 are sequentially provided during execution of a gallery application), the information 4020 in a security on state may be provided in a predetermined sequence. When a user who selects the information 4020 in the security on state is allowed access to the selected information 4020, the security on state of the corresponding information 4020 may be off and be provided to the user. In this case, when a user uses the device together with another person, the security on state information 4020 may be exposed to another person against intention of the user. Accordingly, in order to prevent this problem, the device according to the present embodiment may maintain a security on state of the selected information upon detecting predetermined input. According to the present embodiment, the predetermined input may be press input on a physical button 4030 included in the device.

In more detail, upon detecting predetermined input prior to detection of the selection input 4050 or conversion of the security on state of the information 4020, the device may maintain the security on state of the selected information 4020 according to the selection input 4050 subsequent to the predetermined input. In other words, upon detecting the predetermined input for maintaining the security on state of the corresponding information 4020 prior to selection of the security set stat information 4020, the device may maintain the security on state of the selected information 4020 and may not convert the security on state into a security off state.

For example, when the information 4010 in the security off state is currently provided, the information 4020 to be subsequently provided may be in a security on state according to the selection input 4050 (e.g., slide input) of the user. In this case, when the use recognizes the information 4020 to be subsequently provided and wants to maintain the information 4020 to a security on state, the user may input predetermine input for maintaining a security on state to the device. Upon detecting the predetermined input, the device may maintain a security on state of the information 4020 even if a user who selects the information 4020 in the security on state is allowed access to the corresponding information.

That is, upon detecting the predetermined input for maintaining security of the corresponding information 4020 prior to selection of the information 4020 in the security on state, the device according to the present embodiment may maintain the security on state of the information 4020 irrespective of whether a user who selects the corresponding information 4020 is allowed access.

In this case, the device may maintain a security on state of the information 4020 using various methods.

According to an embodiment of the present specification, upon detecting predetermined input, the device may not obtain a fingerprint from the selection input 4050 for selection of the information 4020 in the security on state to maintain the security on state of the information 4020. In this case, the device may inactivate a sensor unit. In this case, an unnecessary sensor unit is inactivated, which may be effective in terms of power saving. According to another embodiment of the present specification, upon detecting predetermined input, the device may obtain a fingerprint from the selection input 4050 but may not match the obtained fingerprint with a pre-stored fingerprint to maintain a security on state of the information 4020. That is, upon detecting the predetermined input, the device may not compare the obtained fingerprint and the pre-stored fingerprint even if the device detects the selection input 4050 and obtains the fingerprint from the detected selection input 4050. In this case, since the obtained fingerprint and the pre-stored fingerprint do not match, the device may maintain a security on state of the selected information 4020. According to another embodiment, upon detecting predetermined input, the device may obtain a fingerprint from the selection input 4050 and match the obtained fingerprint with the pre-stored fingerprint, or alternatively, may maintain a security on state of the selected information 4020 irrespective of whether the fingerprint is matched.

In addition, as long as the device detects the predetermined input, the device may maintain a security on state of the selected information 4020 to be subsequently selected using various methods. Embodiments of the present specification are not limited to the aforementioned embodiment.

Figure 4B:
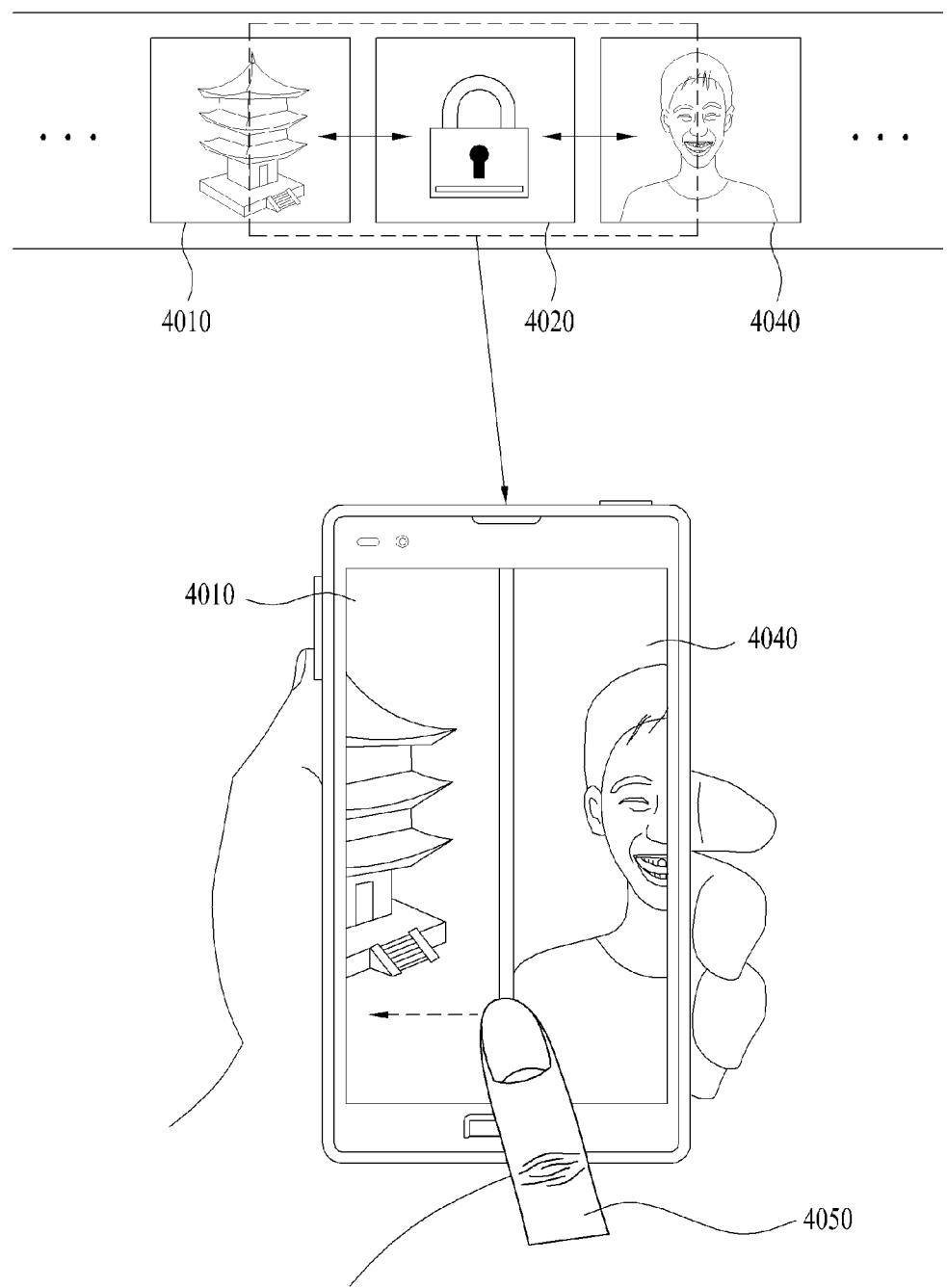
FIG. 4B is a diagram illustrating an embodiment of a display device that skips corresponding information when a security on state of information is maintained according to predetermined input.

FIG. 4B is a diagram illustrating an embodiment of a display device that skips corresponding information when a security on state of information is maintained according to predetermined input.

As described with reference to FIG. 4A, upon detecting predetermined input, the device may maintain a security on state of the selected information 4020.

When the security on state of the information 4020 is maintained, the device may provide an indicator (not shown) indicating a security on state instead of the corresponding information 4020. Since content of the security on state information 4020 should not be exposed to outside, the device may provide an indicator indicating a security on state of information instead of outputting the corresponding information 4020 to inform a user of a security on state of the information 4020 as well as to maintain security of the information 4020. For example, when the selected information 4020 is visual information, the device may display a security image (e.g., a lock image) indicating a security on state instead of the corresponding information 4020 as an indicator. In addition, when the selected information is audible information, the device may provide voice indicating a security on state as an indicator instead of the corresponding information.

According to another embodiment of the present specification, the device may not provide the information 4020 to a user but may skip the information 4020 in the security on state. In this case, the device may skip the information 4020 in the security on state and provide neighboring information 4040 of the skipped information. Here, the neighboring information 4040 may be provided subsequent to the skipped information 4020 and may refer to information in the security off state. Thus, the device may provide information 4040 in the security off state as neighboring information of the corresponding information 4020 instead of the information 4020 in the security on state. Through this, the device may maintain security of the information 4020 in the security on state.

Furthermore, the device may be provided by combining the aforementioned embodiments. For example, the device may provide an indicator or skip the information 4020 in the security on state according to a security setting level of information. In more detail, when a security setting level of the information 4020 is set high, the device may skip the corresponding information 4020 and provide the neighboring information 4040. On the other hand, when the security setting level of the information 4020 is set low, the device may provide an indicator indicating a security on state.

Figure 5A:
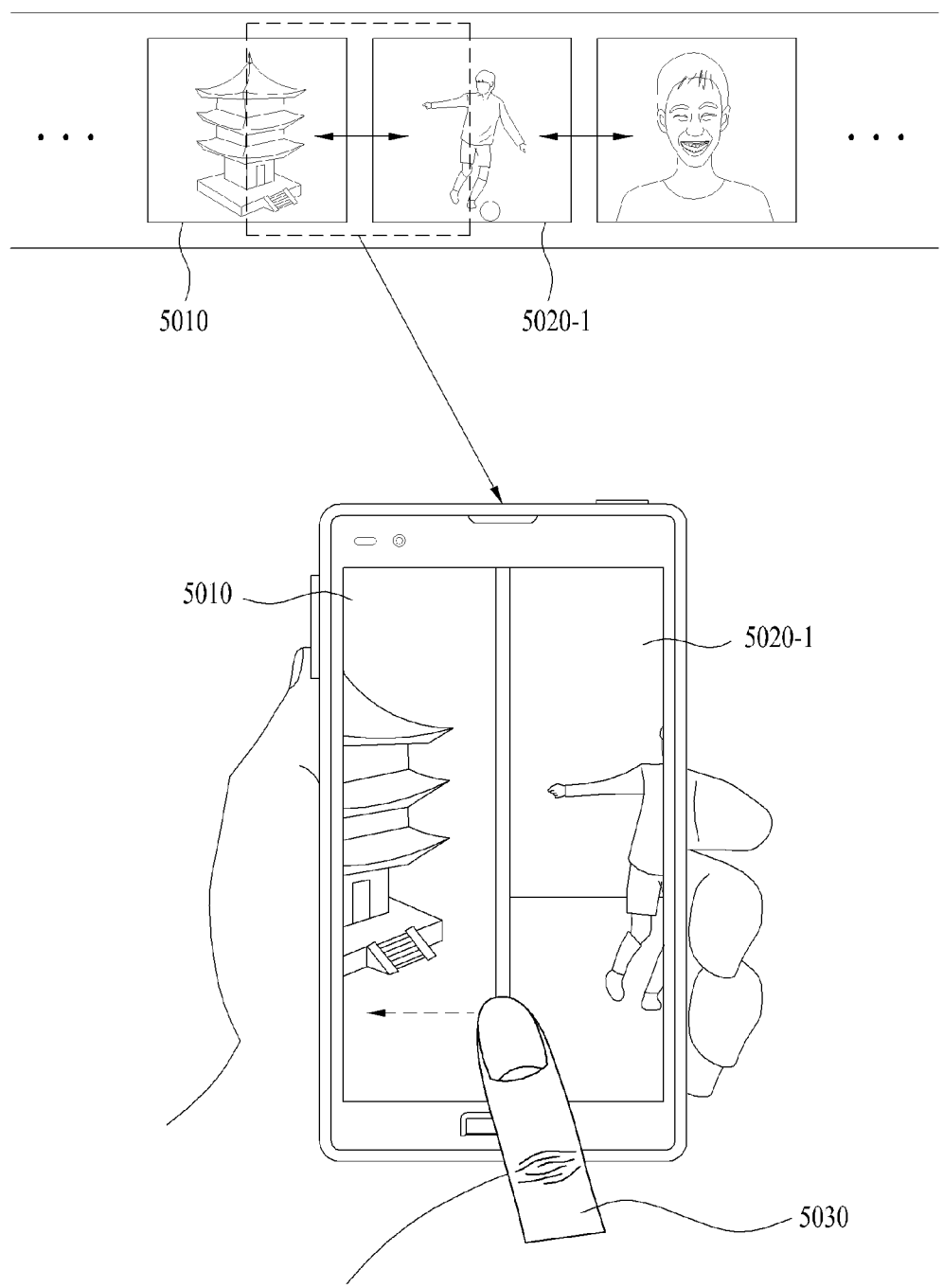
FIG. 5A is a diagram illustrating an embodiment of a display device that detects predetermined input and re-converts information, converted into security off state, into a security on state.

FIG. 5A is a diagram illustrating an embodiment of a display device that detects predetermined input and re-converts security off state of information into a security on state.

According to the present specification, upon detecting selection input 5030, the device may obtain a fingerprint from the detected selection input 5030 and the obtained fingerprint is matched with a pre-stored fingerprint, the device may convert security on state of information into a security off state 5020-1. When the security on state of information is converted into the security off state 5020-1, the device may provide the information converted into a security off state to a user. In other words, when the security on state of information is converted into the security off state 5020-1, the device may output information in the security off state 5020-1. For example, when the information converted into the security off state 5020-1 is visual information, the device may display the corresponding information 5020-1 on a display unit. As another example, when the information converted into a security off state is audible information, the device may output the corresponding information using an audio output unit.

When a plurality of information 5010 and 5020-1 is sequentially provided in predetermined sequences according to the selection input 5030, the security on state of information may be converted into the security off state 5020-1 and may be output according to selection input of a user who is allowed access. Since information is provided in a predetermined sequence and the security on state of information is automatically converted into the security off state according to the selection input 5030, the information may be output irrespective of user intention. The user may maintain a security on state of information via predetermined input in order to prevent this operation of the device (refer to FIG. 4A). However, when the user cannot previously recognize information to be subsequently provide, the user cannot perform predetermined input prior to the selection input 5030. In this case, since security of the selected is automatically offed and the information is output, a problem may arise in that information may be exposed to a user who is allowed access to the corresponding information. For example, when the device is used by a plurality of users together, the aforementioned problems may also arise.

Thus, the device may detect predetermined input for re-converting the security off state of information 5020-1 into a security on state, which will be described below with reference to FIG. 5B.

Figure 5B:
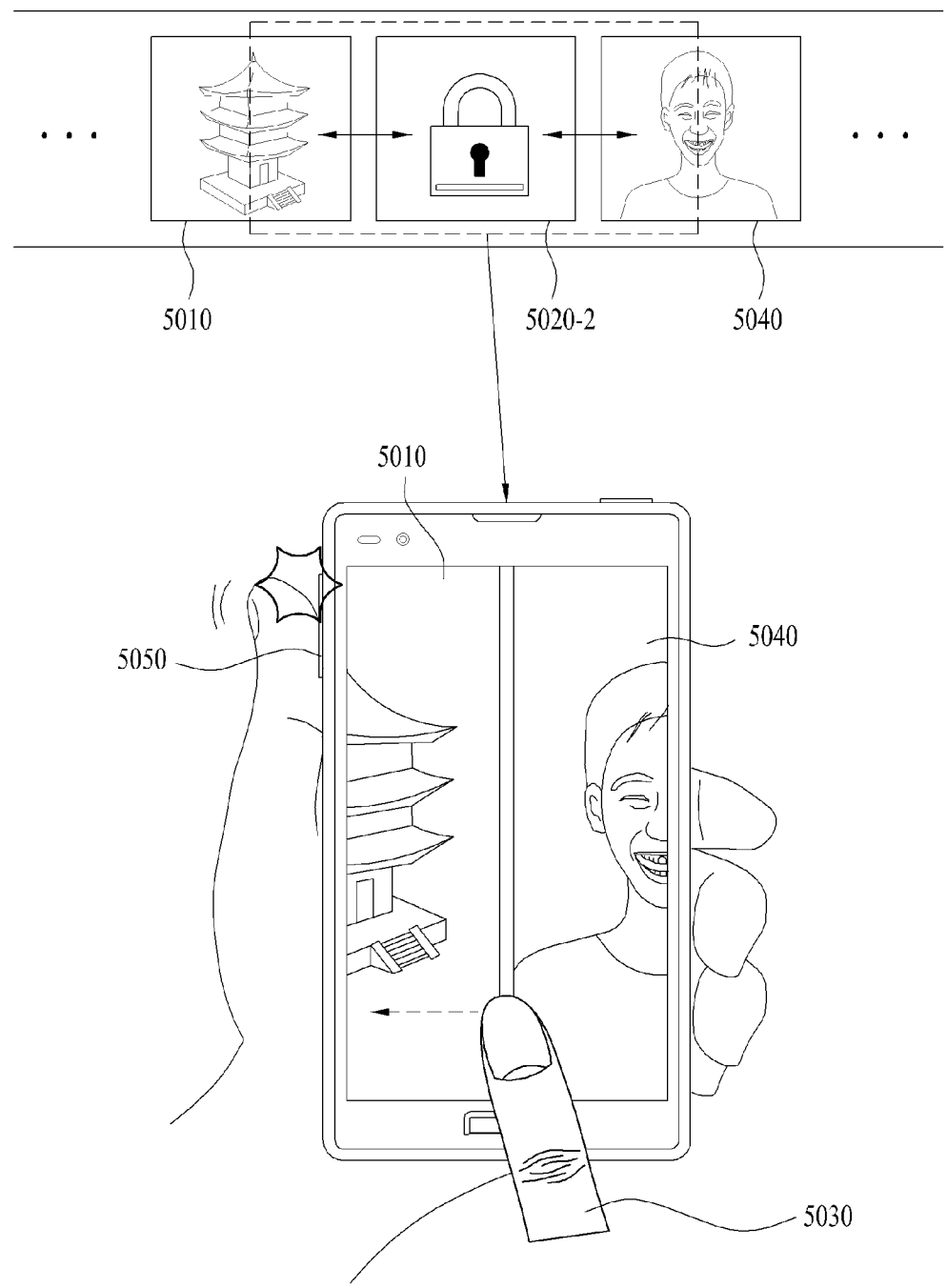
FIG. 5B is a diagram illustrating an embodiment of a display device that detects predetermined input and re-converts information, converted into a security off state, into a security off state.

FIG. 5B is a diagram illustrating an embodiment of a display device that detects predetermined input and re-converts information, converted into a security off state, into a security on state.

When a security on state of information is converted into the security off state 5020-1 according to the selection input 5030 of a user who is allowed access, the device may detect predetermined input for re-converting the information into a security on state 5020-2. In more detail, upon detecting predetermined input within predetermined time after information in the security on state 5020-2 is converted into the security off state 5020-2, the device may re-convert information in the security off state 5020-1 into the security on state 5020-2. Here, the predetermined input may refer to press input of pressing a physical button 5050 installed in the device.

When information, that is converted into the security off state 5020-1 and is currently provided, is re-converted into the security on state 5020-2, the device may provide an indicator (not shown) indicating the security on state 5020-2 instead of the provided information. Here, the indicator may correspond to the indicator described with reference to FIG. 4B. Thus, when the information re-converted into the security on state 5020-2 is visual information, the device may display a security image indicating the security on state 5020-2 as an indicator instead of the corresponding information.

In addition, when information, that is converted into the security off state 5020-1 and is currently provided, is re-converted into the security on state 5020-2, the device may skip the provided information 5020-2 and may provide neighboring information 5040, a detailed description of which corresponds to the detailed description given with reference to FIG. 4B. Thus, the neighboring information 5040 may be information to be provided subsequent to the skipped information 5020-2 and may refer to information in the security off state.

Predetermined input for re-converting information into the security on state 5020-2 may be the same or different from the predetermined input described with reference to FIGS. 4A and 4B. The predetermined input may be set the same or different from the predetermined input according to the design, design objective, manufacturer, and user of the device. Various embodiments of the predetermined input will be described below with reference to FIG. 7.

Although not illustrated in FIG. 5, upon simultaneously detecting the selection input 5030 and the predetermined input, the device may maintain information selected according to the selection input 5030 to the security on state 5020-2 or re-convert the information into the security off state 5020-1. Here, the simultaneous detection includes a case in which a time interval between two inputs is less than predetermined time as well as a case in which two inputs are accurately simultaneously detected. The device may maintain selected information to the security on state 5020-2 or re-convert the information into the security on state 5020-2 so as not to expose the information according to user intention in a case in which the predetermined input and the selection input 5030 are simultaneously detected as well as in a case in which the predetermined input and the selection input 5030 are sequentially detected.

FIG. 6 is a diagram illustrating an embodiment for detecting predetermined input based on a point of time when security on state of information is converted into a security off state.

According to the present specification, the device may detect the predetermined input based on a point of time of converting the security on state of information into a security off state. In more detail, the device may detect predetermined input after/before the security on state of information is converted into a security off state.

Upon detecting the predetermined input before the information is converted into a security off state, the device may maintain a security on state of information selected according to selection input, a detailed description of which is the same as the detailed description given with reference to FIGS. 4A and 4B. On the other hand, upon detecting the predetermined input after the information is converted into a security off state, the device may re-convert information, converted into a security off state, into a security on state, a detailed description of which is the same as the detailed description given with reference to FIGS. 5A and 5B.

In some embodiments, upon detecting the predetermined input before the information is converted into a security off state, the device may also maintain a security on state of other information in an information group containing selected information as well as maintain a security on state of the selected information, as described above. In other words, upon detecting the predetermined input, the device may maintain a security on state of all information in the information group. Thus, even if selection input of a user who is allowed access to the information in the security on state contained in the information group is detected, the device may maintain a security state of the selected information. In this case, the user does not have to additionally perform the predetermined input on the other information in the security on state contained in the information group.

Figure 7:
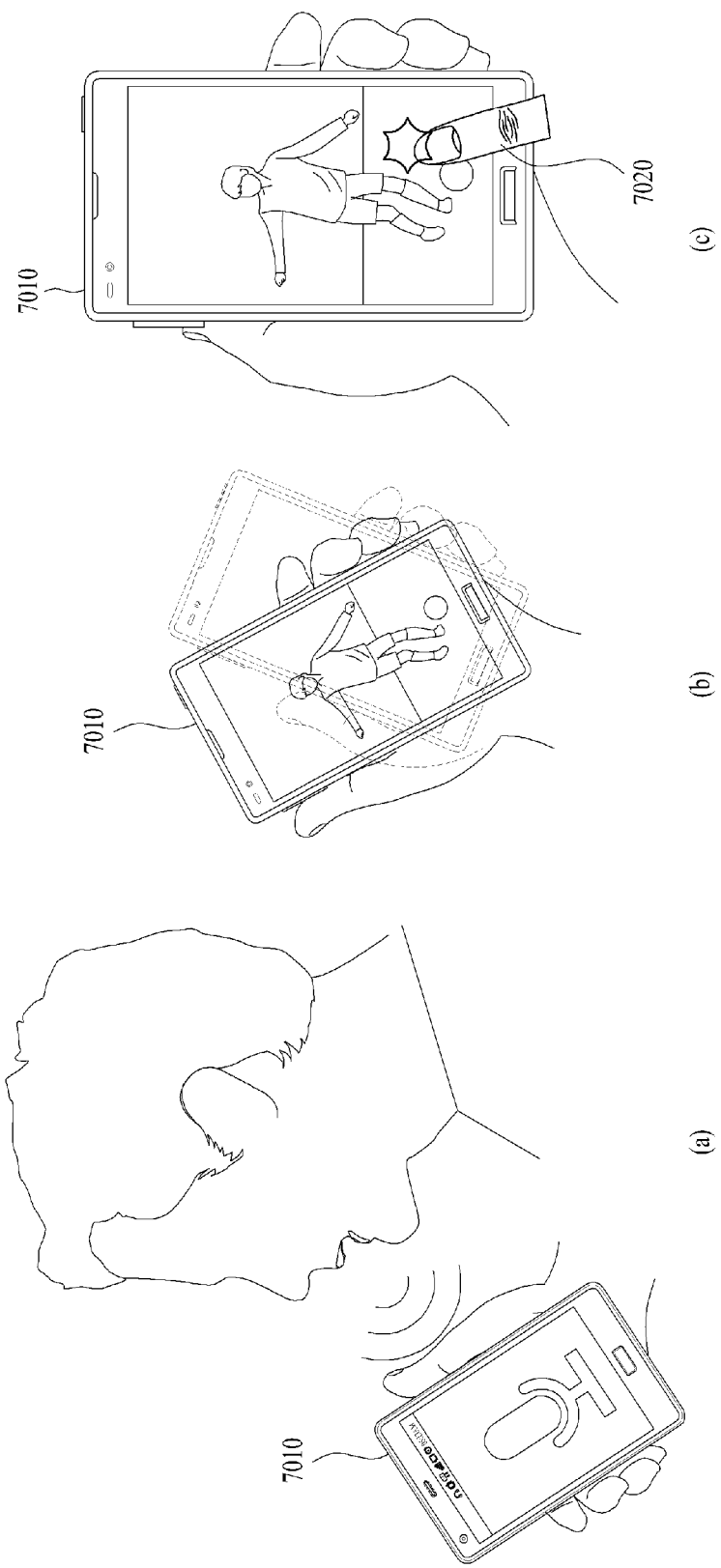
FIG. 7 is a diagram illustrating embodiments of predetermined input for maintaining information to a security on state or re-converting the information into a security on state.

FIG. 7 is a diagram illustrating embodiments of predetermined input for maintaining information to a security on state or re-converting the information into a security on state.

The predetermined input may refer to user input on a device 7010 for maintaining information to a security on state or re-converting the information into a security on state. The device 7010 may detect predetermined input using at least one of sensor mounted on the device 7010 and maintain security on state of the information or re-convert the security off state of the information into the security on state upon detecting the predetermined input.

The predetermined input may be configured according to various embodiments. According to an embodiment of the specification, the predetermined input may be press input on a physical button installed on the device 7010 (refer to FIGS. 4A and 5B). For example, the predetermined button may be press input on a home button, a sound control button, etc. included in the device 7010.

As another example, as illustrated in FIG. 7(*a*), the predetermined input may be predetermined voice input inputted on the device 7010. The user may input voice for maintaining a security on state of information to the device 7010 to maintain the security on state of the information. For example, when the user inputs voice "maintain security" to the device 7010 prior to selection of the information in the security on state, the device 7010 may maintain a security on state of the selected information.

According to another embodiment, as illustrated in FIG. 7(*b*), the predetermined input may be predetermined gesture input inputted on the device 7010. The user may take a predetermined gesture with respect to the device 7010 in order to maintain a security on state of the information to maintain the security on state of the information. For example, when the user takes a gesture of shaking the device 7010 in right and left directions prior to selection of information in security on state, the device 7010 may maintain a security on state of the selected information. In addition, when the user takes a gesture of shaking the device 7010 in right and left directions after the user selects information in security on state and converts the information into a security off state, the device 7010 may re-convert the information, converted into a security off state, into a security on state.

According to another embodiment, as illustrated in FIG. 7(*c*), the predetermined input may be predetermined touch input 7020 inputted on the device 7010. The user may perform the predetermined touch input 7020 on the device 7010 in order to maintain a security on state of information to maintain the security on state of the information. The predetermined touch input 7020 may refer to various touch inputs such as slide input, drag input, long-press input, short-press input, etc. on a display unit. For example, when the user performs long-press input 7020 on the device 7010 prior to selection of information in the security on state, the device 7010 may maintain a security on state of the selected information.

Figure 8:
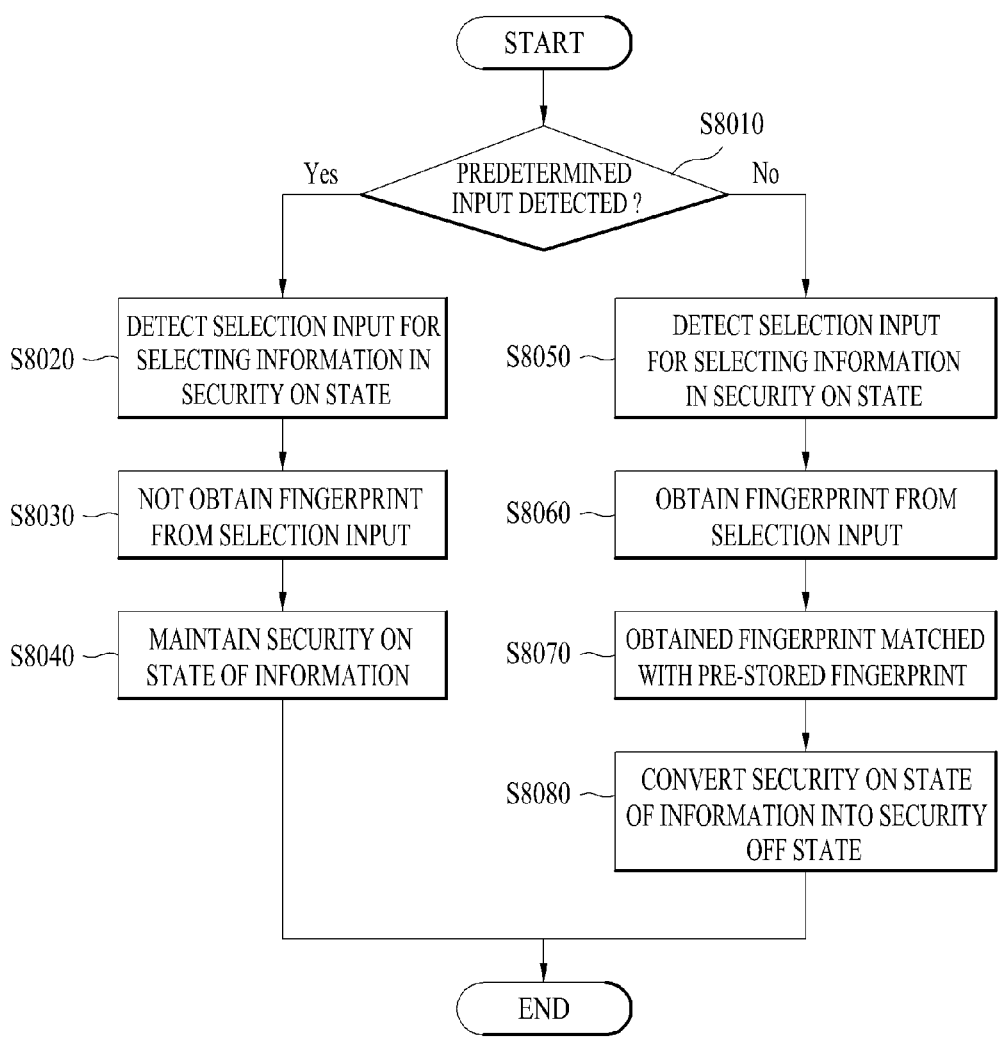
FIG. 8 is a flowchart of a method for controlling a display device.

FIG. 8 is a flowchart of a method for controlling a display device. In this flowchart, similar or repeated detailed description given with reference to FIGS. 1 to 7 will be omitted herein.

First, the device may determine whether predetermined input is detected (S8010). Here, the predetermined input may refer to input for maintaining a security on state of the information. According to an embodiment of the specification, the predetermined input may be press input on a physical button mounted on the device. In addition, the predetermined input may be configured according to various embodiments, which will be described in detail with reference to FIG. 7.

When the predetermined input is detected in the previous step, the device may detect selection input for selecting information in security on state (S8020). Here, the selection input may refer to various touch inputs of the user for selection of information. The device may detect selection input of the user on a display unit using at least one sensor included in the display unit to select information. The selection input has been described above with reference to FIG. 2.

Then, the device may not obtain a fingerprint from the selection input (S8030). This is because the predetermined input for maintaining the security on state of the information is detected in operation S8010. Since the fingerprint is obtained in order to determine a user who is allowed access to information in the security on state, the device may simply select the information in the security on state according to the detected selection input but may not obtain a fingerprint from the selection input. Alternatively, although not illustrated in this flowchart, the device may obtain a fingerprint from the detected selection input but may not match the obtained fingerprint with a pre-stored fingerprint. Alternatively, the device may obtain a fingerprint from the detected selection input and match the obtained fingerprint and the pre-stored fingerprint but may maintain a security on state of the information selected irrespective of a match result, as described with reference to FIG. 4A.

Then, the device may maintain information to a security on state (S8040). In detail, the device may maintain the security on state of the information selected according to the selection input. When the device provides information, a security on state of which is maintained, is provided, the device may skip the corresponding information and provide neighboring information of the corresponding information or provide an indicator indicating the security on state, as described with reference to FIG. 4B.

When the predetermined input is not detected in operation S8010, the device may detect selection input for selecting information (S8050) in the security on state. A detailed description of the current operation is the same as that of operation S8020 and thus will be omitted herein.

Then, the device may obtain a fingerprint from the selection input (S8060) in order to determine whether a user of the selection input is allowed to access to the selected information. The device may obtain a fingerprint from the selection input using a sensor unit.

Then, the device may match the obtained fingerprint with a pre-stored fingerprint (S8070). In this case, the device may compare the fingerprint obtained from the selection input and the pre-stored fingerprint. Moreover, the device may judge that the two fingerprints are matched with each other when a matched degree exceeds a threshold value, the device may determined that the fingerprint and the pre-stored fingerprint are matched with each other. The pre-stored fingerprint may indicate a fingerprint of a user who is allowed access to the information in the security on state, as described in detail with reference to FIG. 3.

Then, the device may convert the security on state of the information into a security off state (S8080). The obtained fingerprint and the pre-stored fingerprint are matched each other because the user of the selection input is allowed access to the information in the security on state. Thus, the device may convert the security on state of information selected into a security off state according to the selection input, and provide the information to the user, as described in detail with reference to FIG. 4B.

Although not illustrated in this flowchart, when predetermined input of information converted into a security off state is detected, the device may re-convert the corresponding information into a security on state. When the information is re-converted into a security on state, the device may skip information, which is converted into a security off state and is currently output, and provide neighboring information of the skipped information or may provide an indicator indicating a security on state, as described in detail with reference to FIGS. 5A and 5B.

For convenience of description, diagrams have been separately described. However, it may be possible to obtain a new embodiment by combining the aforementioned embodiments described with reference to each diagram. In addition, according to needs of one of ordinary skill in the art, a design of a computer readable recording medium having recorded thereon a program for executing the aforementioned embodiments is within the scope of the present specification.

The device and the method for controlling the same according to the aforementioned embodiments may be configured by selectively combining an entire or partial portion of the aforementioned embodiments in various modified forms rather than being limited to the configuration and method of the aforementioned embodiments.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

The device and the method for controlling the same according to the present specification can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), magnetic tapes, floppy disks, optical data storage devices, etc. In addition, the computer readable recording medium may be embodied as a carrier wave such as transmission via the Internet. The computer readable recording medium can also be distributed over network coupled computer systems so that the computer readable code is stored and executed in a distributed fashion.

In the present specification, an object invention and a method invention have been described. If necessary, both inventions may be subsidiarily applied.

According to an embodiment, when predetermined input for maintaining a security on state is detected, a fingerprint is not obtained from the selection input, and thus, a sensor unit does not have to be activated in order to obtain the fingerprint. Accordingly, power required to activate the sensor unit does not have to be consumed, thereby achieving power saving.

According to another embodiment, when predetermined input for maintaining a security on state is detected, a fingerprint obtained from the selection input and a pre-stored fingerprint are not matched, and thus, additional processes are not required. Accordingly, an operation speed of the device is increased and unnecessary memory consumption is reduced.

According to another embodiment, when predetermined input for maintaining a security on state is detected, even if a fingerprint obtained from the selection input and a pre-stored fingerprint are matched, the security on state of the selected information is maintained, thereby preventing security-set information from being indiscriminately exposed to other people who are not authenticated.

Detailed advantages of the embodiments have been described above.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A display device comprising:
    a display unit configured to display an image and to sense a touch input;
    a sensor unit configured to sense a fingerprint from the touch input on the display unit;
    a storage unit configured to store data; and
    a processor configured to control the display unit, the sensor unit, and the storage unit,
    wherein the processor is further configured to:
    detect a selection input for selecting a first information in a security on state;
    obtain the fingerprint from the selection input;
    when a predetermined input for the first information is not detected and the obtained fingerprint is matched with a pre-stored fingerprint, convert the first information from the security on state into a security off state; and
    when the predetermined input for the first information is detected before the first information is converted into the security off state, maintain the first information to the security on state and output a second information even if the obtained fingerprint is matched with the pre-stored fingerprint, and
    wherein the predetermined input is one of a press input on physical button of the display unit, a voice input inputted on the display device, a gesture input inputted on the display device or a predetermined touch input inputted on the display unit.

2. The display device according to claim 1, wherein the processor, when the predetermined input for the first information is detected after the first information is converted into the security off state, is further configured to re-convert the first information from the security off state into the security on state.

3. The display device according to claim 2, wherein the processor, when the predetermined input for the first information is detected within predetermined time after the first information is converted into the security off state, is further configured to re-convert the first information into the security on state.

4. The display device according to claim 1, wherein the processor is further configured to maintain the first information to the security on state or re-convert the first information into the security on state when the selection input and the predetermined input is simultaneously detected.

5. The display device according to claim 1, wherein the processor is further configured to:
when a predetermined input for the first information was detected before the first information is converted into the security off state,
obtain the fingerprint from the selection input when the selection input is detected, and
maintain the first information to the security on state by not matching the obtained fingerprint with the pre-stored fingerprint.

6. The display device according to claim 1, wherein the processor is further configured to:
when a predetermined input for the first information was detected before the first information is converted into the security off state,
match the obtained fingerprint with the pre-stored fingerprint, and
not convert the first information into the security off state and maintain the first information to the security on state even if the obtained fingerprint is matched with the pre-stored fingerprint.

7. The display device according to claim 1, wherein the processor is further configured to:
when a predetermined input for the first information was detected before the first information is converted into the security off state,
maintain the security on state of information contained in an information group containing the first information.

8. The display device according to claim 1, wherein the processor is further configured to:
compare the fingerprint obtained from the selection input and the pre-stored fingerprint,
convert the first information from the security on state into the security off state, when a matched degree between the obtained fingerprint and the pre-stored fingerprint exceeds a threshold value.

9. The display device according to claim 8, wherein the processor is further configured to maintain the security on state of the first information, when the matched degree between the obtained fingerprint and the pre-stored fingerprint does not exceed the threshold value.

10. The display device according to claim 1, wherein the processor is further configured to output the first information when the first information is converted from the security on state into the security off state.

11. The display device according to claim 10, wherein the processor is further configured to skip the first information being currently output and output second information when the first information is re-converted from the security off state into the security set state.

12. The display device according to claim 11, wherein the second information is located in a forward direction or reverse direction of the first information.

13. The display device according to claim 1, wherein the selection input is sliding input or dragging input.

14. The display device according to claim 1, wherein the selection input is short-press input or long-press input.

15. The display device according to claim 1, wherein the first information includes at least one of visual information, audible information, tactile information, or olfactory information.

16. The display device according to claim 15, wherein the first information corresponds to a picture, a photo, a home image, a document, a text, an application execution image, or a moving picture when the first information is the visual information.

17. The display device according to claim 1, wherein the physical button comprises a home button and a sound control button.

18. A method for maintaining security on information provided by a display device, the method comprising:
detecting a selection input for selecting a first information in a security on state;
obtaining a fingerprint from the selection input;
when a predetermined input for the first information is not detected and the obtained fingerprint is matched with a pre-stored fingerprint, converting the first information from the security on state into a security off state; and
when the predetermined input for the first information is detected before the first information is converted into the security off state, maintaining the first information to the security on state and outputting a second information even if the obtained fingerprint is matched with the pre-stored fingerprint,
wherein the predetermined input is one of a press input on physical button of the display device, a voice input inputted on the display device, a gesture input inputted on the display device or a predetermined touch input inputted on the display device.

* * * * *